United States Patent
Hong et al.

(10) Patent No.: US 7,569,178 B2
(45) Date of Patent: Aug. 4, 2009

(54) APPARATUS AND METHOD FOR IN-SITU CALIBRATION OF VACUUM GAUGE BY ABSOLUTE METHOD AND COMPARISON METHOD

(75) Inventors: Seung Soo Hong, Daejeon (KR); Yong Hyeon Shin, Daejeon (KR); Kwang Hwa Chung, Daejeon (KR); In Tae Lim, Daejeon (KR)

(73) Assignee: Korea Research Institute of Standards and Science (KR)

( * ) Notice: Subject to any disclaimer, the term of this patent is extended or adjusted under 35 U.S.C. 154(b) by 382 days.

(21) Appl. No.: 11/418,733

(22) Filed: May 5, 2006

(65) Prior Publication Data
US 2007/0108671 A1   May 17, 2007

(30) Foreign Application Priority Data
Oct. 27, 2005   (KR) ..................... 10-2005-0101657

(51) Int. Cl.
*G01D 18/00* (2006.01)
*C21D 11/00* (2006.01)
(52) U.S. Cl. ......................... 266/78; 73/1.01
(58) Field of Classification Search ................... 266/78; 73/1.01
See application file for complete search history.

(56) References Cited
U.S. PATENT DOCUMENTS

| | | | | |
|---|---|---|---|---|
| 3,537,474 A * | 11/1970 | Rohrer | ................... | 137/565.23 |
| 3,780,563 A * | 12/1973 | Outlaw et al. | ................ | 73/1.58 |
| 3,783,678 A * | 1/1974 | Das et al. | ..................... | 73/1.58 |
| 2006/0124666 A1* | 6/2006 | Takahashi | .................... | 222/135 |

* cited by examiner

*Primary Examiner*—Scott Kastler
(74) *Attorney, Agent, or Firm*—Akerman Senterfitt

(57) ABSTRACT

An apparatus and method for in-situ calibration of a vacuum gauge by absolute method and comparison method, which can carry out absolute calibration using a static type standard for measuring pressures of vacuum chambers by expanding and moving gas between four vacuum chambers of different volumes in order, and comparison calibration of vacuum gauges in an in-situ state without movement of the vacuum gauges according to a method for controlling gas flow through an orifice using a calibrated standard vacuum gauge. Thus, the absolute calibration and the comparative calibration of the vacuum gauges which have been separately carried out by different apparatuses till now can be carried out by just one apparatus, whereby economical efficiency and convenience in calibration of vacuum gauges are maximized.

6 Claims, 5 Drawing Sheets

APPARATUS AND METHOD FOR IN-SITU CALIBRATION OF VACUUM GAUGE BY ABSOLUTE METHOD AND COMPARISON METHOD

BACKGROUND OF THE INVENTION

1. Field of the Invention

The present invention relates to apparatus and method for in-situ calibration of a vacuum gauge by absolute method and comparison method, and more particularly, to apparatus and method for in-situ calibration of a vacuum gauge by absolute method and comparison method, which can carry out absolute calibration using a static type standard for measuring pressures of vacuum chambers by expanding and moving gas to the vacuum chambers of different volumes in order and comparison calibration of vacuum gauges in a range of 1 mPa~1 kPa in an in-situ state without movement of the vacuum gauges according to a method for controlling gas flow through an orifice using a calibrated standard vacuum gauge.

2. Background Art

In general, till now, calibrations by absolute method and comparison method have been carried out by different apparatuses since they could be carried out by the different apparatuses. So, the necessity of an apparatus for reducing a calibration period of time and improving calibration efficiency to economically and efficiently calibrate a vacuum gauge has come to the front.

SUMMARY OF THE INVENTION

Accordingly, the present invention has been made to solve the above disadvantages occurring in the prior arts, and it is an object of the present invention to provide apparatus and method for in-situ calibration of a vacuum gauge by absolute method and comparison method, which can reduce of a calibration period of time and calibrate a vacuum gauge economically and efficiently by providing both of absolute and comparison measurements.

To accomplish the above objects, according to the present invention, there is provided an apparatus for in-situ calibration of a vacuum gauge by absolute method and comparison method comprising: a fourth vacuum chamber (400) filled with gas; first to third vacuum chambers (100~300) to which gas of the fourth vacuum chamber (400) is expanded and moved through pipes in order; vacuum gauges (10, 20, 50), a low vacuum gauge (30), a high vacuum gauge (40), vacuum gauges (60) being calibrated, and dummy vacuum gauges (70) for measuring pressure; leak valves (a, p) and opening and closing valves (b~o, q) for controlling gas inflow and outflow of the vacuum chambers (100~400); a high vacuum pump (500) and a low vacuum pump (600) for exhausting the vacuum chambers (100~400) up to the ultimate pressure; and an orifice (700).

In another aspect of the present invention, there is provided a method for in-situ calibration of a vacuum gauge by absolute method and comparison method comprising: an absolute calibration step by a static type standard for measuring pressures of first to third vacuum chambers (100~300) by expanding and moving gas through pipes from a fourth vacuum chamber (400) to the first to third vacuum chambers (100~300) in order, the first to third vacuum chambers having different volumes from one another; and a comparative calibration step by a method for controlling gas flow through an orifice in an in-situ state without movement of the vacuum gauge using the absolutely calibrated standard vacuum gauge.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
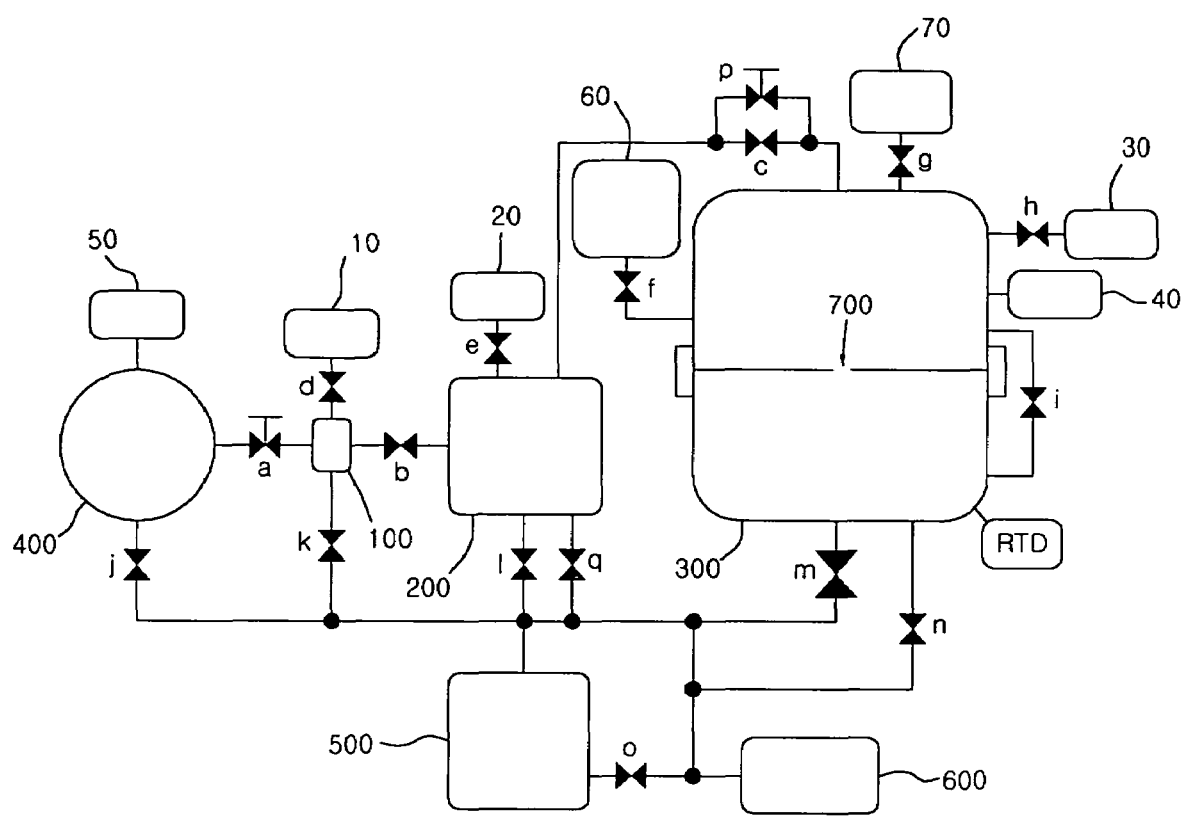
FIG. 1 is a brief view of an in-situ calibration apparatus for a vacuum gauge in a range of 1 mPa-1 kPa pressure in which absolute measurement of a low vacuum gauge 30 by a static method and comparison measurement by a method for controlling gas flow through an orifice are combined.
Figure 2:
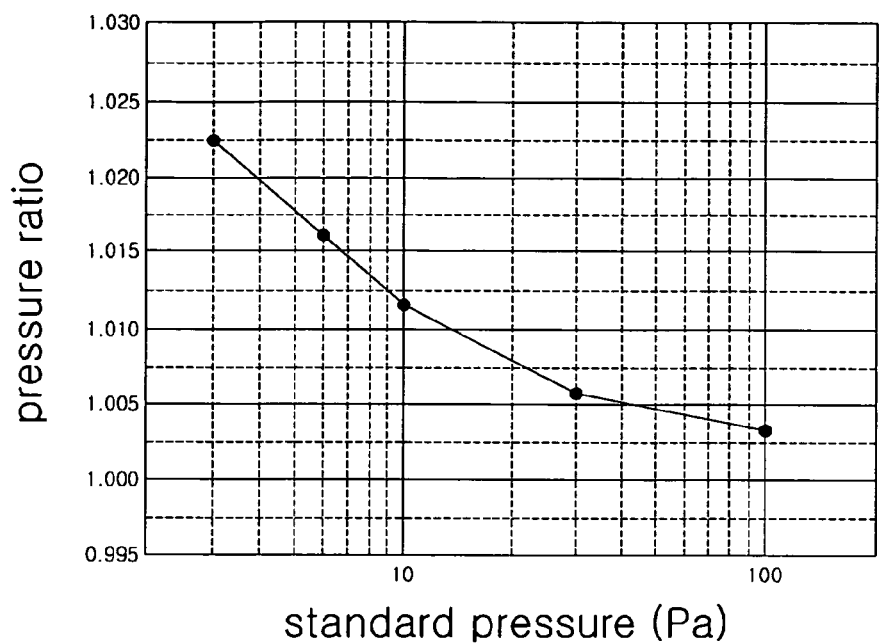
FIG. 2 shows an example of an absolute calibration result of the vacuum gauge 30 being calibrated, which is mounted on a third vacuum chamber 300 of FIG. 1, using a static method, wherein a horizontal axis indicates standard pressure of the third vacuum chamber 300, and a vertical axis indicates a pressure ratio that indication pressure of the vacuum gauge 30 being calibrated is divided by the standard pressure.
Figure 3:
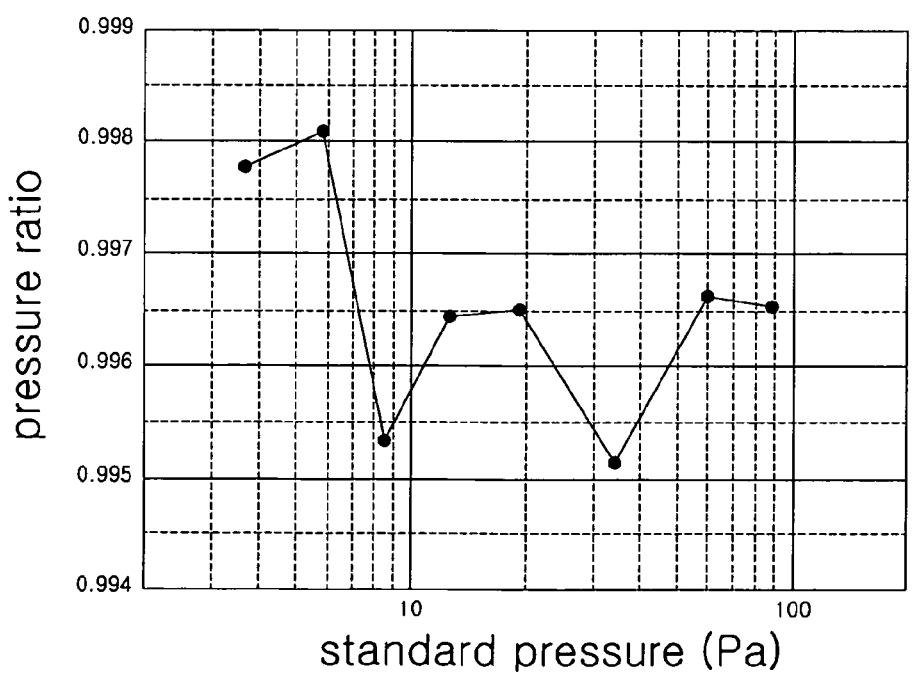
FIG. 3 shows an example of a compared result of the vacuum gauge by comparison using the vacuum gauge 30, which is calibrated by the static method, as a standard vacuum gauge.

FIG. 1 shows a configuration of an apparatus for in-situ calibration of a vacuum gauge by absolute method and comparison method, FIG. 2 shows an example of a calibrated result of a low vacuum gauge calibrated by a static method according to the present invention, and FIG. 3 shows an example of a calibrated result of a low vacuum gauge calibrated by a comparison method according to the present invention The fundamental principle of the static method is Boyle's law that a pressure difference between two vacuum chambers with different volumes is in proportion to a volume difference. That is, the fundamental principle is that, since $P_1 V_1 = P_2 V_2$ in the same temperature, unknown pressure $P_2$ can be obtained if a pressure $P_1$, and a ratio of volumes $(V_1/V_2)$ are known. Therefore, like the apparatus shown in FIG. 1, for an exact calibration of a vacuum gauge, uncertainty by absolute method and comparison method is decided according to the exact calibration of a vacuum gauge 10 mounted on a first vacuum chamber 100, a volume ratio measurement among first to third vacuum chamber 100~300, a degas volume of the vacuum chambers, the ultimate vacuum level of the third vacuum chamber 300, and so on.

As shown in FIG. 1, the apparatus for in-situ calibration of a vacuum gauge in low-vacuum and high-vacuum areas includes a fourth vacuum chamber 400, the first to third vacuum chambers 100~300, vacuum gauges 10, 20 and 50, a low vacuum gauge 30, a high vacuum gauge 40, vacuum gauges 60 being calibrated, dummy vacuum gauges 70, leak valves (a, p) and opening and closing valves (b~o, q), a high vacuum pump 500 and a low vacuum pump 600, and an orifice 700.

The fourth vacuum chamber 400 is connected to the first vacuum chamber 100 through a pipe on which the leak valve (a) is mounted, the first vacuum chamber 100 is connected to the second vacuum chamber 200 through a pipe on which the opening and closing valve (b) is mounted, and the second vacuum chamber 200 is connected to the third vacuum chamber 300 through a pipe on which the opening and closing valve (c) and the leak valve (p) are connected in parallel and a pipe on which the opening and closing valve (q) is mounted.

Furthermore, the vacuum chambers 100~400 are connected to the high vacuum pump 500 through pipes on which the opening and closing valves (j, k, l, m) are respectively mounted, and the high vacuum pump 500 is connected to the low vacuum pump 600 through a pipe on which the opening and closing valve (o) is mounted. Moreover, the pipe located between the low vacuum pump 600 and the opening and closing valve (o) is branched, whereby the pipe is connected to the pipe on which the opening and closing valve (m) is mounted between the third vacuum chamber and the high vacuum pump 500 and to another pipe on which the opening and closing valve (n) connected with the third vacuum chamber 300 is mounted. The high vacuum pump 500 and the low vacuum pump 600 are mounted to exhaust the vacuum chambers up to the ultimate pressure.

The pressure-measuring vacuum gauge 50 is mounted on one side of the fourth vacuum chamber 400, and the fourth vacuum chamber 400 is filled with gas. Particularly, it is preferable that the fourth vacuum chamber 400 is filled with nitrogen as of high purity (99.9%).

The pressure-measuring vacuum gauge 10 is mounted on one side of the first vacuum chamber 100, and the opening and closing valve (d) is mounted between the first vacuum chamber 100 and the pressure-measuring vacuum gauge 10. Additionally, the pressure-measuring vacuum gauge 20 is mounted on one side of the second vacuum chamber 200, and the opening and closing valve (e) is mounted between the second vacuum chamber 200 and the pressure-measuring vacuum gauge 20. Moreover, the low vacuum gauge 30 and the high vacuum gauge 40 are mounted on one side of the third vacuum chamber 300, and the opening and closing valve (h) is mounted between the third vacuum chamber 300 and the low vacuum gauge 30. The calibrated vacuum gauges 60 are mounted on another side of the third vacuum chamber 300, and the opening and closing valve (f) is mounted between the calibrated vacuum gauges 60 and the third vacuum chamber 300. In addition, the dummy vacuum gauges 70 are mounted on the other side of the third vacuum chamber 300, and the opening and closing valve (g) is mounted between the third vacuum chamber 300 and the dummy vacuum gauges 70.

Furthermore, the orifice 700 is formed inside the third vacuum chamber 300 to stabilize a flow of gas.

The first to third vacuum chambers 100~300 have different volumes from one another, the volumes of the first vacuum chamber 100, the second vacuum chamber 200 and the third vacuum chamber 300 are gradually increased in order.

Moreover, the vacuum chambers 100~400 are made of SUS304 material.

The leak valves (a, p) and opening and closing valves (b~o; q) control gas inflow and outflow of the vacuum chambers (100~400).

Figure 4:
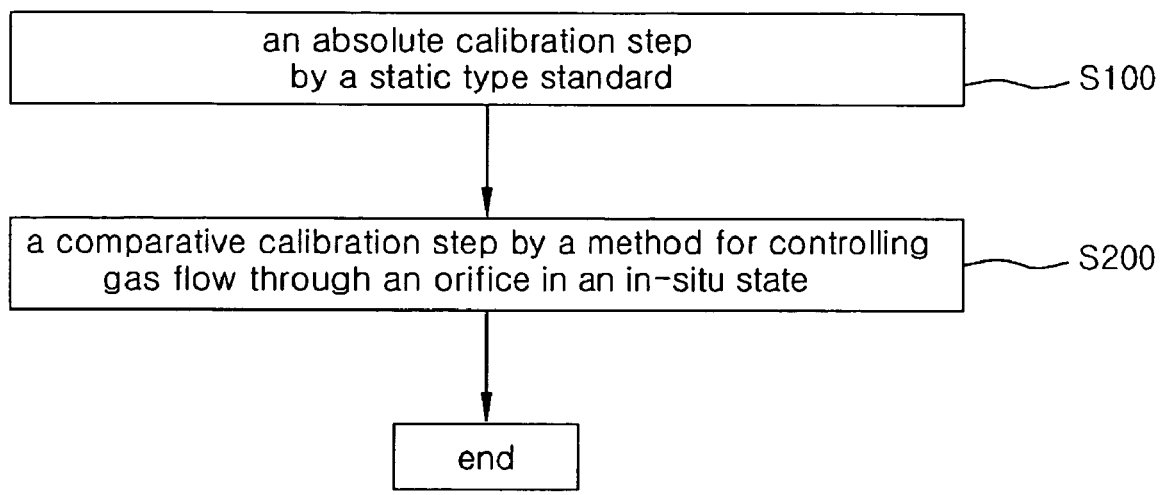
FIGS. 4 to 6 show an absolute calibration step and a comparative calibration step of the vacuum gauge according to this invention.
Figure 5:
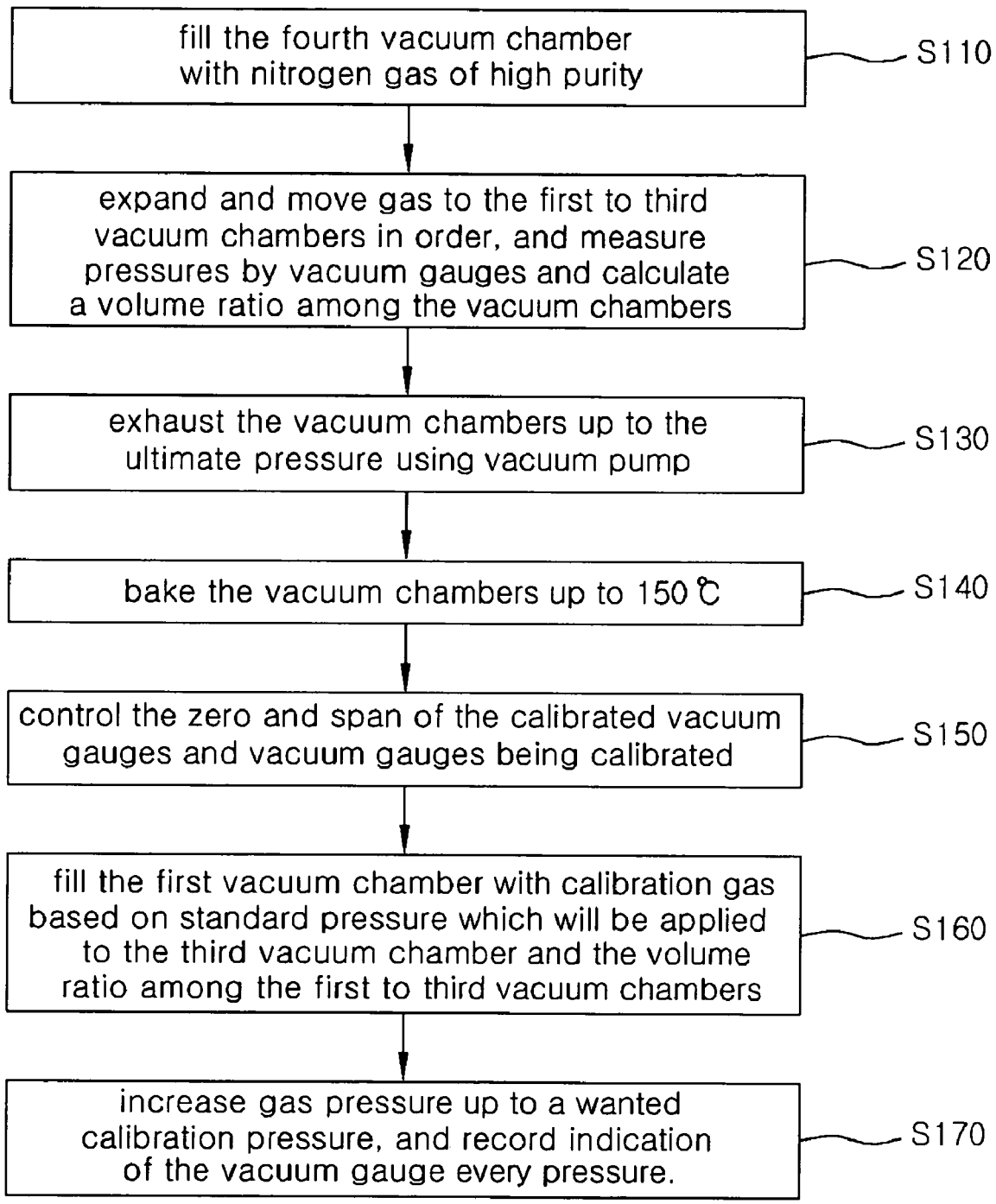
Figure 6:
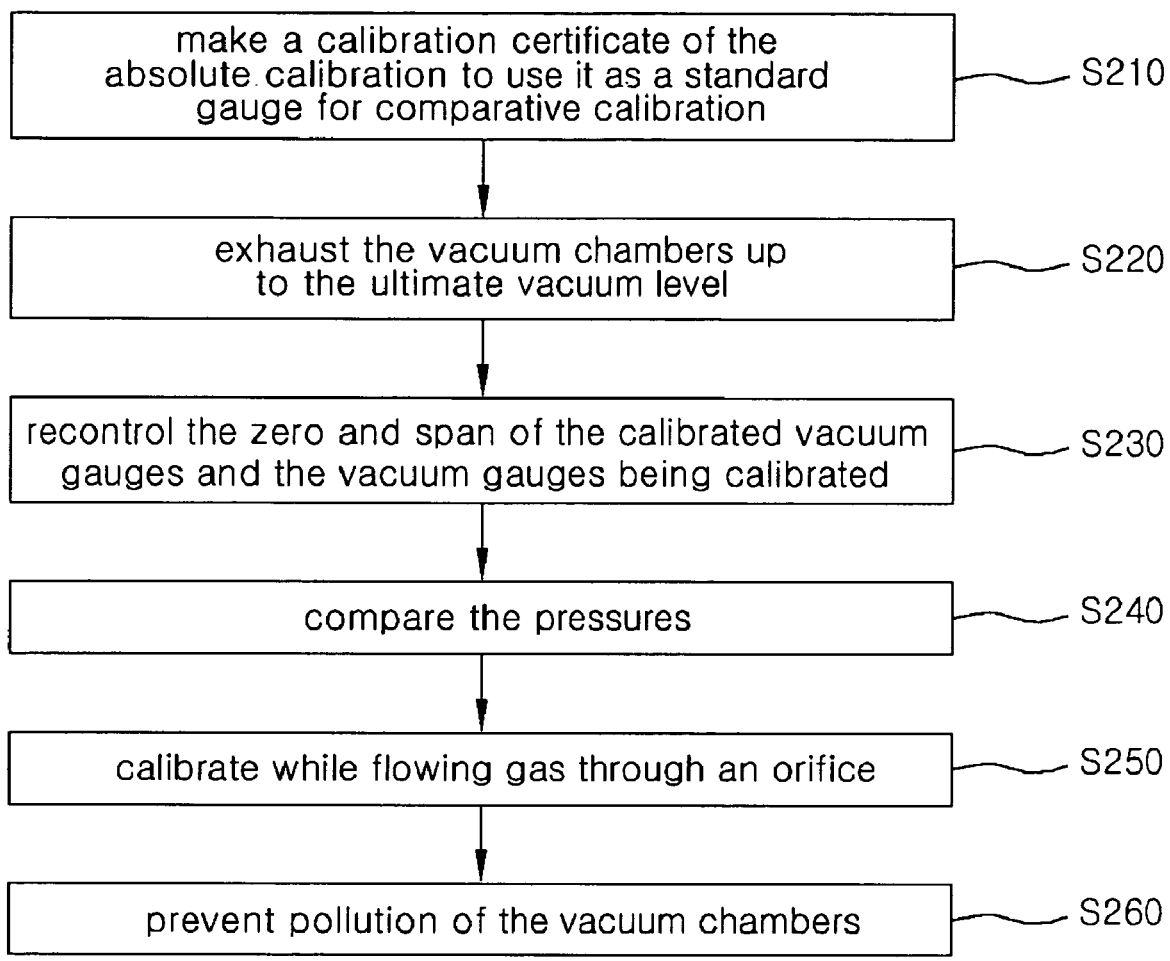

FIGS. 4 to 6 show an absolute calibration step and a comparative calibration step of the vacuum gauge according to the present invention.

As shown in FIGS. 4 to 6, a method for in-situ calibration of a vacuum gauge in low-vacuum and high-vacuum areas according to the present invention includes: an absolute calibration step (S100) by a static type standard for measuring pressures of the first to third vacuum chambers 100~300 by expanding and moving gas through the pipes from the fourth vacuum chamber 400 to the first to third vacuum chambers 100~300 in order which have different volumes; and a comparative calibration step (S200) by a method for controlling gas flow through the orifice in an in-situ state without movement of the vacuum gauge using the absolutely calibrated standard vacuum gauge.

At this time, the absolute calibration step (S100) includes the steps of: filling the fourth vacuum chamber 400 with nitrogen gas of high purity (99.9%) (S110); opening and closing the valves (a, b, c, q) in order to expand and move gas to the first to third vacuum chambers 100~300 in order, and measuring pressures by the vacuum gauges 10~40 and calculating a volume ratio among the vacuum chambers (S120); exhausting the vacuum chambers up to the ultimate pressure using the high vacuum pump 500 and the low vacuum pump 600 (S130); baking the vacuum chambers up to 150° C. in order to increase a vacuum level by reducing moisture and a degas amount of the vacuum chamber (S140); checking the ultimate vacuum level at normal temperature and controlling the zero and span of the vacuum gauges 30 and 40 which will be used for calibration and the vacuum gauges 60 and 70 being calibrated (S150); filling the first vacuum chamber 100 with calibration gas based on standard pressure which will be applied to the third vacuum chamber 300 and the volume ratio among the first to third vacuum chambers 100~300 (S160); and opening and closing the valves (a~q) according to a static type calibration method to increase gas pressure up to a wanted calibration pressure by expanding and moving gas to the vacuum chambers through the pipes, and recording indication pressure of the vacuum gauge every pressure.

Moreover, the comparative calibration step (S200) includes the steps of: arranging data of the low vacuum (more than 1 Pa) gauge 30 and the high vacuum (less than 1 Pa) gauge 40 and making a calibration certificate to use it as a standard gauge for comparative calibration when the absolute calibration is ended (S210); exhausting the vacuum chamber up to the ultimate vacuum level for comparing a common vacuum gauge with the calibrated standard vacuum gauge (S220); recontrolling the zero and span of the calibrated vacuum gauges 30 and 40 and the vacuum gauges 60 and 70 being calibrated (S230); reading pressure of the vacuum gauges 30 and 40 absolutely calibrated to a wanted pressure and pressure of the vacuum gauges 60 and 70 being calibrated and comparing the pressures of the calibrated vacuum gauges 30 and 40 and the vacuum gauges 60 and 70 being calibrated while increasing gas through the leak valve (p) (S240); calibrating by the low vacuum gauge 60 while applying pressure after closing the valve (m) and calibrating by the high vacuum gauge 70 while flowing gas through the orifice 700 after opening the valve (m) (S250); and turning off all pumps 500 and 600 when the calibration is ended, and filling the vacuum chambers with nitrogen of high purity in order to prevent pollution of the vacuum chambers (S260).

At this time, it is preferable to further include technologies for generating and calibrating standard pressure from the low vacuum area to the high vacuum area and a technology for combining the absolute calibration and the comparative calibration.

Referring to FIGS. 1 to 6, a detailed operating method of the in-situ calibration apparatus for the vacuum gauge by absolute method and comparison method according to the present invention will be described.

A. Fill the fourth vacuum chamber 400 with nitrogen gas of high purity (99.9%).

B. Exhaust the vacuum chambers up to the ultimate pressure using the high vacuum pump 500 and the low vacuum pump 600.

C. Bake the vacuum chambers up to 150° C. in order to increase a vacuum level by reducing moisture and a degas amount of the vacuum chamber.

D. Check the ultimate vacuum level at normal temperature and controlling the zero and span of the vacuum gauges 30 and 40 which will be used for calibration and the vacuum gauges 60 and 70 being calibrated.

E. Fill the first vacuum chamber 100 with calibration gas based on standard pressure which will be applied to the third vacuum chamber 300 and the volume ratio among the first to third vacuum chambers 100~300.

F. Open and close the valve (a), the valve (b) and the valves (c, q) in order to expand and move gas to the first to third vacuum chambers 100~300 through pipes in order, and respectively measure pressures by the vacuum gauges 10~40 and calculate volume ratio among the vacuum chambers.

G. Record indication pressure of the vacuum gauge every pressure while expanding and moving gas to the vacuum chambers through the pipes in order by opening and closing the valves (a~q) according to the static method and the calibration method to increase gas pressure up to a wanted calibration pressure.

H. Calibrate the low vacuum gauge 30 and the high vacuum gauge 40 according the static type calibration method when the volume ratio of the vacuum chambers 100~300 is decided.

I. Arrange data of the low vacuum (more than 1 Pa) gauge 30 and the high vacuum (less than 1 Pa) gauge 40 and make a calibration certificate to use it as a standard gauge for comparative calibration when the absolute calibration is ended.

J. Exhaust the vacuum chamber up to the ultimate vacuum level for comparing a common vacuum gauge with the calibrated standard vacuum gauge.

K. Recontrol the zero and span of the calibrated vacuum gauges 30 and 40 and the vacuum gauges 60 and 70 being calibrated.

L. Read and compare pressures of the absolutely calibrated vacuum gauges 30 and 40 and the vacuum gauges 60 and 70 being calibrated up to the wanted pressure while increasing gas through the leak valve (p).

M. Calibrate by the low vacuum gauge 60 while applying pressure after closing the valve (m), and calibrate by the high vacuum gauge 70 while flowing gas through the orifice 700 after opening the valve (m).

N. Turn off all pumps 500 and 600 when the calibration is ended, and fill the vacuum chambers with nitrogen of high purity in order to prevent pollution of the vacuum chambers.

As described above, according to the present invention, the absolute calibration and the comparative calibration of the vacuum gauges which have been separately carried out by different apparatuses till now can be carried out by just one apparatus, whereby economical efficiency and convenience in calibration of vacuum gauges are maximized.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for in-situ calibration of a vacuum gauge by absolute method and comparison method comprising:

a fourth vacuum chamber filled with gas;

first, second and third vacuum chambers to which gas of the fourth vacuum chamber is expanded and moved through pipes in order;

calibrated vacuum gauges for respectively measuring pressures of the first, second and fourth vacuum chambers;

a low vacuum gauge, a high vacuum gauge, vacuum gauges being calibrated and dummy vacuum gauges for measuring pressure of the third vacuum chamber;

leak valves and opening and closing valves for controlling gas inflow and outflow of all of the vacuum chambers;

a high vacuum pump and a low vacuum pump for exhausting all the vacuum chambers up to the ultimate pressure; and an orifice for stabilizing a flow of gas inside the third vacuum chamber.

2. The apparatus according to claim 1, wherein all the vacuum chambers are made of SUS304 material.

3. The apparatus according to claim 1, wherein the volumes of the first to third vacuum chambers are gradually increased in order of the first vacuum chamber, the second vacuum chamber and the third vacuum chamber.

4. A method for in-situ calibration of a vacuum gauge by absolute method and comparison method using an apparatus comprising:

a fourth vacuum chamber filled with gas;

first, second and third vacuum chambers to which gas of the fourth vacuum chamber is expanded and moved through pipes in order;

vacuum gauges for respectively measuring pressures of the first, second and fourth vacuum chambers:

a low vacuum gauge, a high vacuum gauge, vacuum gauges being calibrated and dummy vacuum gauges for measuring pressure of the third vacuum chamber;

leak valves and opening and closing valves for controlling gas inflow and outflow of all of the vacuum chambers;

a high vacuum pump and a low vacuum pump for exhausting all the vacuum chambers up to the ultimate pressure; and an orifice for stabilizing a flow of gas inside the third vacuum chamber, the method comprising the steps of:

an absolute calibration step by a static type standard for measuring pressures of the first to third vacuum chambers by expanding and moving gas from the fourth vacuum chamber to the first to third vacuum chambers in order, the first to third vacuum chambers having different volumes from one another; and a comparative calibration step for controlling gas flow through an orifice in an in-situ state without movement of the vacuum gauge using the absolutely calibrated standard vacuum gauge.

5. The method according to claim 4, wherein the absolute calibration step comprises the steps of:

filling the fourth vacuum chamber with nitrogen gas of high purity (99.9%); opening and closing valves in order to expand and move gas to the first to third vacuum chambers in order, and measuring pressures by the vacuum gauges which will be used for calibration and calculating a volume ratio among the vacuum chambers;

exhausting the vacuum chambers up to the ultimate pressure using a high vacuum pump and a low vacuum pump;

baking the vacuum chambers up to 150° C. in order to increase a vacuum level by reducing moisture and a degas amount of the vacuum chambers;

checking the ultimate vacuum level at normal temperature and controlling the zero and span of the vacuum gauges, which will be used for calibration, and the vacuum gauges being calibrated;

filling the first vacuum chamber with calibration gas based on standard pressure which will be applied to the third vacuum chamber and the volume ratio among the first to third vacuum chambers; and opening and closing the valves according to a static type calibration method to increase gas pressure up to a wanted calibration pressure by expanding and moving gas to the vacuum chambers through the pipes, and recording indication pressure of the vacuum gauge every pressure.

6. The method according to claim 4, wherein the comparative calibration step comprises the steps of:

arranging data of the low vacuum (more than 1 Pa) gauge and the high vacuum (less than 1 Pa) gauge and making a calibration certificate to use it as a standard gauge for comparative calibration when the absolute calibration is ended;

exhausting the vacuum chambers up to the ultimate vacuum level for comparing a common vacuum gauge with the calibrated standard vacuum gauge;

recontrolling the zero and span of the calibrated vacuum gauges and the vacuum gauges being calibrated;

reading pressure of the vacuum gauges absolutely calibrated to a wanted pressure and pressure of the vacuum gauges being calibrated and comparing the pressures of the calibrated vacuum gauges and the vacuum gauges being calibrated while increasing gas through the leak valve;

calibrating by the low vacuum gauge while applying pressure after closing a valve and calibrating by the high vacuum gauge while flowing gas through an orifice after opening the valve; and turning off all pumps when the calibration is ended, and filling the vacuum chambers with nitrogen of high purity in order to prevent pollution of the vacuum chambers.

* * * * *